R. C. CAMPBELL.
FILTER.
APPLICATION FILED JAN. 27, 1920.
1,430,518. Patented Sept. 26, 1922.
2 SHEETS—SHEET 1.
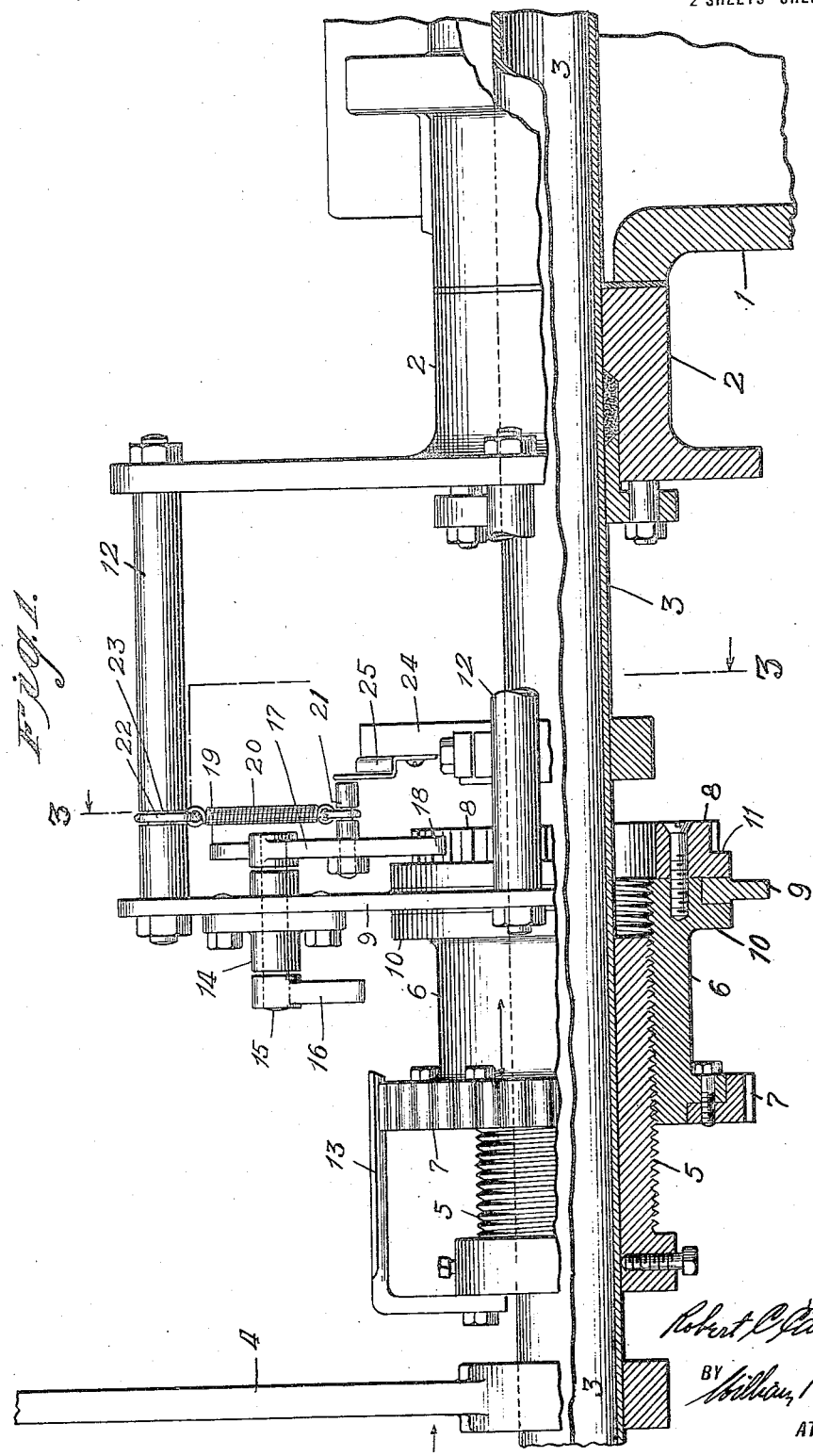

R. C. CAMPBELL.
FILTER.
APPLICATION FILED JAN. 27, 1920.
1,430,518.
Patented Sept. 26, 1922.
2 SHEETS—SHEET 2.
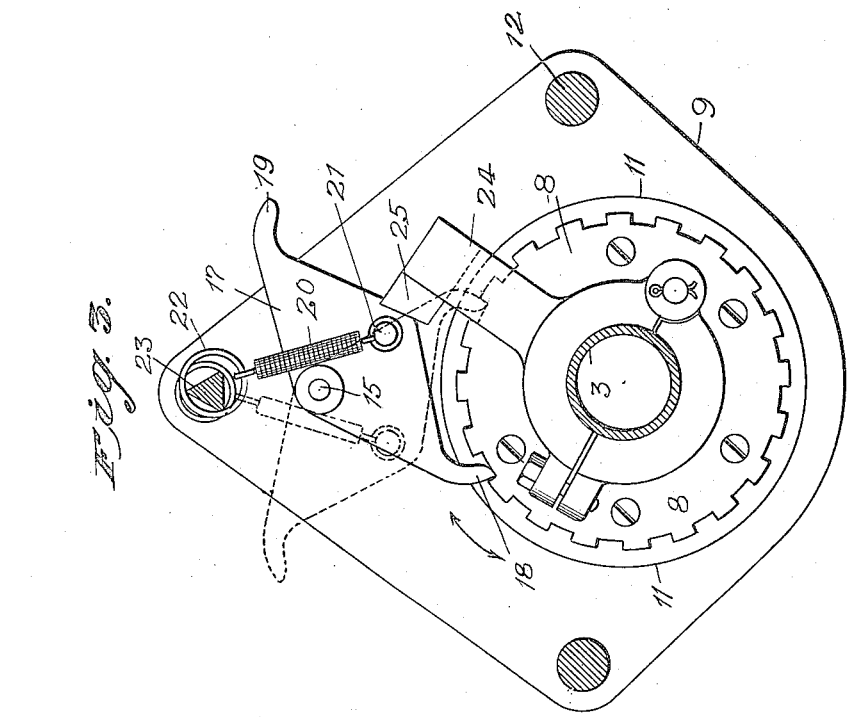
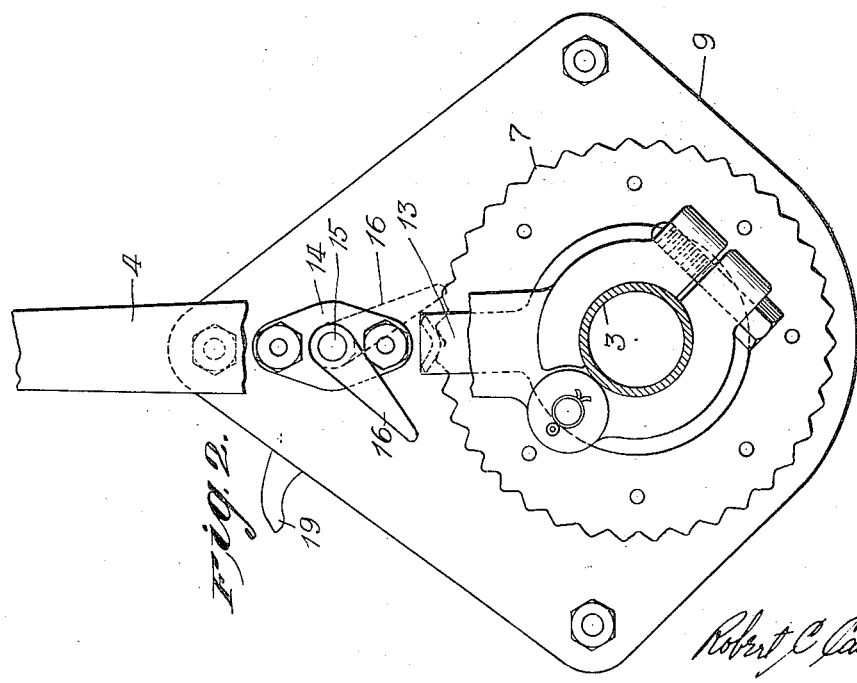

Patented Sept. 26, 1922.

1,430,518

UNITED STATES PATENT OFFICE.

ROBERT C. CAMPBELL, OF MILLBURN, NEW JERSEY, ASSIGNOR TO UNITED FILTERS CORPORATION, OF NEW YORK, N. Y., A CORPORATION OF DELAWARE.

FILTER.

Application filed January 27, 1920. Serial No. 354,500.

*To all whom it may concern:*

Be it known that I, ROBERT C. CAMPBELL, a citizen of the United States, residing in Millburn, in the county of Essex and State of New Jersey, have invented certain new and useful Improvements in Filters, of which the following is a specification.

This invention relates to improvements in filters, and more particularly to means for freeing the filter elements thereof of any cake, sediment or the like, which may have been deposited on the filter surfaces during the filtering operation.

The invention is adapted for use in connection with filters of various types and forms, but it is particularly applicable to filters of the type which comprises a plurality of spaced filter elements and a sluicing pipe provided with outlets disposed between adjacent filter elements, such as is shown, for example, in United States Letters Patent No. 1,237,838, granted August 21st, 1917, to Ernest J. Sweetland.

It has heretofore been proposed to rotate the sluicing pipe with respect to the filter casing, in order to more effectually remove the cake from the surfaces of the filter elements, but although this has proved to be quite satisfactory, it has been found that the cake is not always entirely removed. The failure to remove all of the cake may be due to the fact that the filter elements are unequally spaced from the outlet openings of the sluicing pipe, or that they are spaced too far therefrom, or that the filter surfaces are uneven, in either of which instances the streams issuing from the outlet openings will not properly engage the filter surfaces to free them of the cake.

One of the objects of this invention is to provide mechanism for moving the sluicing pipe back and forth in a longitudinal direction in order that the outlet openings thereof will be brought alternately into close proximity to the surfaces of the filter elements between which they are disposed, thus insuring that the streams issuing from the openings will effectually dislodge or remove all of the cake from the filter surfaces.

The invention further has for its object to provide mechanism of this character in which the reversal of the longitudinal movement of the sluicing pipe is automatically effected, whereby the operation thereof may be carried on by unskilled labor.

Further objects of the invention are to provide mechanism of this character, which is simple in construction, and positive and efficient in its operation.

Other objects will in part be obvious and in part be pointed out hereinafter.

In the accompanying drawings, forming part of this specification, in which is shown a preferred embodiment of the invention, Figure 1 is a view in side elevation of the mechanism for actuating the sluicing pipe, parts being shown in section;

Figure 2 is an end view thereof, as seen from the left of Figure 1, and

Figure 3 is a sectional view taken on the line 3—3 of Figure 1.

Referring to the drawings, there is shown a portion of a casing 1, of a filter of any approved type or form, provided with a suitable stuffing box 2, through which extends a sluicing pipe 3, adapted to be rotated back and forth through an angle of approximately 110°, and to be reciprocated in the direction of its length. To the exterior portion of the pipe 3 are secured an operating handle 4, and a traversing screw 5, which engages the threads of a nut 6 provided at its opposite ends with ratchet wheels 7 and 8. Slidably engaging the nut 6 is a plate 9 which extends within a groove formed between flanges 10 and 11 formed on the nut 6 and ratchet wheel 8, respectively. The plate 9, which serves to prevent longitudinal movement of the nut 6 while permitting rotary movement thereof is secured to the casing 1 by spacing bolts 12. Secured to the outer end of the traversing screw 5 is a longitudinally extending pawl 13 which co-acts with the ratchet wheel 7 to rotate the nut 6, and the ratchet wheels carried, unless the same is positively held against rotation, in which case the resiliency of the pawl 13 will permit it to ride over the surface of the ratchet wheel upon rotation of the screw 5 being effected. The pawl 13 is of such a length that it will remain in engagement with the ratchet wheel 7 as the sluicing pipe 3 is reciprocated longitudinally in the manner hereinafter described.

Rotatably supported within a bearing 14, carried by the plate 9, and extending outwardly from both sides of the plate, is a shaft 15, to one end of which is secured an arm 16, adapted to be positioned in the path of travel of the free end of the pawl 13, and to be engaged thereby as the sluicing pipe 3 approaches its innermost position with respect to the filter casing 1. To the other end of the shaft 15 is secured an elongated member 17, provided at its ends with oppositely disposed dogs 18 and 19 adapted, as the member 17 is oscillated, to be alternately moved into and out of engagement with the ratchet wheel 8, whereby the latter may be held against rotation in one direction or the other, depending upon which one of the dogs 18 and 19 is in engagement therewith. The member 17 is held in its operative positions, until it is caused to oscillate as hereinafter described, by means of a spring 20 having one of its ends fastened to a pin 21 carried by the member 17 and positioned below the shaft 15, and having the other of its ends fastened to a ring 22 supported upon a knife edge 23 formed on the bolt 12, which extends between the upper end of the plate 9 and the filter casing 1. In the operative positions of the member 17, the pin 21 will be positioned upon one side or the other of a vertical plane extending through the knife edge 23 and the axis of the shaft 15, as a result of which the spring 20 will serve to hold either the pawl 18 or the pawl 19, as the case may be, in firm engagement with the surface of the ratchet wheel 8.

Secured to the sluicing pipe 3, between the filter casing 1 and the ratchet wheel 8 is an arm 24 to the free end of which is secured an actuating member 25 adapted to co-act with the pin 21, as the sluicing pipe 3 approaches its outermost position with respect to the filter casing 1, to cause the member 17 to be oscillated from its position as shown in Figure 3 to its alternate position. The arm 16 and the member 17 are secured to the shaft 15 in such a manner that during the inward movement of the pipe 3, the arm 16 will be in position to be engaged by the free end of the pawl 13, and during the outward movement of the pipe, the member 17 will be so positioned as to place the pin 21 in the path of the actuating member 25 on the arm 24, thus insuring that these parts, together with the shaft 15, will be alternately oscillated in opposite directions as the pipe 3 approaches the innermost and outermost limits of its reciprocating movement. The initial oscillating movement of the arm 16, member 17 and shaft 15 will be effected either by the pawl 13 engaging the arm 16, or by the actuating member 25 engaging the pin 21, and such movement of the parts will continue until the pin 21 is carried past the vertical plane extending through the knife edge 23 and the axis of the shaft 15. As soon as the pin passes this plane, the completion of the movement of the oscillating parts will be effected by the spring 20, which cause them instantly to assume their alternate positions.

In operation, assuming the parts to be in the positions shown in the drawing, the handle 4 is moved downwardly to the right, as viewed in Figure 2, thereby causing rotation of the sluicing pipe 3 and the traversing screw 5, and as the dog 18 is in engagement with the ratchet wheel 8, the nut 6 and the ratchet wheels 7 and 8 thereon, will be rotated by the pawl 13, as a result of which there will be no longitudinal movement of the pipe 3. Upon reversing the movement of the handle, the nut 6 will be held against rotation, by the engagement of the dog with one of the teeth of the ratchet wheel 8, as a result of which the sluicing pipe 3 and the parts secured thereto, will be moved outwardly a slight distance with respect to the casing 1. By repeating the oscillating movements of the handle, the pipe 3 will be moved outwardly, step by step, until the actuating member 25 on the arm 24 is brought into alignment with the pin 21. As the handle is now again moved downwardly, the member 25 will engage the pin 21, thereby causing the member 17 and the arm 16 to be moved to occupy their alternate positions, in the manner above described, with the dog 19 engaging the ratchet wheel 8 and the arm 16 in position to be engaged by the free end of the pawl 13. As the pawl 19, which now engages the ratchet wheel 8, is oppositely disposed with respect to the dog 18, the relative rotary movement between the nut 6 and sluicing pipe 3 will be reversed, and consequently, the pipe will be moved inwardly in a step by step manner, as the oscillating movement of the handle 4 is continued. This inward movement of the pipe 3 will continue until the free end of the pawl 13 engages and actuates the arm 16, whereupon the arm and the member 17 are shifted to their former positions, as a result of which the pipe 3 will be moved outwardly as above described.

It will be seen that, by continuously oscillating the handle 4, the pipe 3 is alternately moved inwardly and outwardly, in a step by step manner, and that the reversal of the movement of the pipe is effected automatically, thus rendering it unnecessary for the operator to be continually on the watch to ascertain when such reversals of movement should be effected. As the pipe 3 is thus reciprocated, then each of the outlets thereof is alternately brought into close proximity to the surfaces of the filter members between which it is disposed, as a result of which any cake which has been deposited on the filter surfaces will be removed or dislodged in a highly efficient manner. Furthermore, as the reversal of the movement of the pipe 3 is effected automatically, there will be no danger of the filter surfaces being damaged by the contacting therewith of the outlet nozzles of the pipe.

In place of the hand-operated nozzle 4, an automatic drive mechanism may be used, and in this way the reciprocation of the sluicing pipe may be automatically operated.

While one preferred embodiment of the mechanism for actuating the sluicing pipe has been shown and described, it is of course understood that the invention is not limited thereto as many changes may be made in the construction shown without departing from the spirit of the invention.

Having thus described my invention what I claim as new herein and desire to secure by Letters Patent is:

1. Sluicing mechanism for filters comprising a longitudinally movable sluicing pipe, and means for intermittently moving said pipe.

2. Sluicing mechanism for filters comprising a longitudinally movable sluicing pipe, and means for reciprocating said pipe.

3. Sluicing mechanism for filters comprising a longitudinally movable sluicing pipe, and means for automatically reciprocating said pipe.

4. Sluicing mechanism for filters comprising a longitudinally movable sluicing pipe, and means for moving said pipe step by step.

5. Sluicing mechanism for filters comprising a sluicing pipe and means for longitudinally moving said pipe and rotating the same about its axis.

6. Sluicing mechanism for filters comprising a sluicing pipe and means for simultaneously longitudinally moving said pipe and rotating the same about its axis.

7. Sluicing mechanism for filters comprising a sluicing pipe, means for rotating said pipe about its axis, and means for simultaneously moving said pipe longitudinally.

8. Sluicing mechanism for filters comprising a sluicing pipe, means for oscillating said pipe, and means for moving said pipe longitudinally during alternating oscillations thereof.

9. Sluicing mechanism for filters comprising a sluicing pipe and means for oscillating and longitudinally reciprocating said pipe.

10. Sluicing mechanism for filters comprising a sluicing pipe, means for oscillating said pipe and means for longitudinally reciprocating said pipe.

11. Sluicing mechanism for filters comprising a sluicing pipe, means for oscillating said pipe and means for longitudinally reciprocating said pipe, said means comprising reversing mechanism for retaining said longitudinal movement within designated limits.

12. Sluicing mechanism for filters comprising a sluicing pipe, means for oscillating said pipe, and means for longitudinally reciprocating said pipe, said means comprising a reversing mechanism automatically actuated in response to a designated range of movement of the pipe.

13. Sluicing mechanism for filters comprising a sluicing pipe, means for oscillating said pipe, means for simultaneously moving said pipe back and forth longitudinally, and means for changing the direction of movement of said pipe after it has traveled a predetermined distance in either direction.

14. Sluicing mechanism for filters comprising a sluicing pipe having a screw thread thereon, a nut engaging said screw thread and held against longitudinal movement, means for oscillating said pipe, and means for rotating said nut in unison with said pipe as the latter is oscillated in one direction, and for holding said nut against rotation as said pipe is oscillated in the other direction whereby longitudinal movement of said pipe is effected.

15. Sluicing mechanism for filters comprising a sluicing pipe having a screw thread thereon, a rotatable nut engaging said screw thread and held against longitudinal movement, said nut being provided with a ratchet wheel, a driving pawl operatively connected to said pipe and engaging said ratchet wheel, means for oscillating said pipe, and means for holding said nut against movement during alternate oscillations of said pipe, whereby a step-by-step longitudinal movement of said pipe is effected.

16. Sluicing mechanism for filters comprising a sluicing pipe having a screw thread thereon, a rotatable nut engaging said screw thread and held against longitudinal movement, means for oscillating said pipe, actuating means operatively connected to said pipe and to said nut, and means adapted alternately to hold said nut against rotation in opposite directions, whereby longitudinal reciprocation of said pipe is effected.

17. Sluicing mechanism for filters comprising a sluicing pipe having a screw thread thereon, a rotatable nut engaging said screw thread and held against longitudinal movement, means for oscillating said pipe, actuating means operatively connected to said pipe and to said nut, means adapted alternately to hold said nut against rotation in opposite directions whereby longitudinal reciprocation of said pipe is effected and means for automatically causing said holding means to occupy its alternate positions as said pipe reaches the limits of its travel.

ROBERT C. CAMPBELL.